United States Patent
Yoshida et al.

(10) Patent No.: US 7,811,478 B2
(45) Date of Patent: Oct. 12, 2010

(54) POSITIVE-ELECTRODE ACTIVE MATERIAL POWDER

(75) Inventors: Takashi Yoshida, Kanagawa (JP); Kenji Nakane, Ibaraki (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 12/282,049

(22) PCT Filed: Mar. 12, 2007

(86) PCT No.: PCT/JP2007/055331
§ 371 (c)(1),
(2), (4) Date: Sep. 8, 2008

(87) PCT Pub. No.: WO2007/105818
PCT Pub. Date: Sep. 20, 2007

(65) Prior Publication Data
US 2009/0008602 A1 Jan. 8, 2009

(30) Foreign Application Priority Data
Mar. 15, 2006 (JP) .............................. 2006-070391

(51) Int. Cl.
H01B 1/02 (2006.01)
H01B 1/08 (2006.01)
H01M 4/00 (2006.01)

(52) U.S. Cl. .............................. 252/519.15; 252/521.2; 252/518.1; 252/182.1; 429/223; 429/220; 429/221

(58) Field of Classification Search ............ 252/519.15, 252/521.2, 518.1, 182.1; 429/223, 220, 221
See application file for complete search history.

(56) References Cited

U.S. PATENT DOCUMENTS

| | | | |
|---|---|---|---|
| 6,001,139 A | 12/1999 | Asanuma et al. | |
| 6,730,435 B1 * | 5/2004 | Nakane et al. | 429/218.1 |
| 2001/0036577 A1 * | 11/2001 | Nakane et al. | 429/223 |
| 2002/0061444 A1 | 5/2002 | Kweon et al. | |
| 2002/0110736 A1 | 8/2002 | Kweon et al. | |
| 2002/0127473 A1 | 9/2002 | Ooya et al. | |
| 2003/0054250 A1 | 3/2003 | Kweon et al. | |
| 2003/0082448 A1 | 5/2003 | Cho et al. | |
| 2003/0162090 A1 * | 8/2003 | Okada et al. | 429/137 |
| 2003/0180620 A1 * | 9/2003 | Nakane et al. | 429/231.95 |
| 2004/0018429 A1 | 1/2004 | Kweon et al. | |
| 2005/0227147 A1 | 10/2005 | Kogetsu et al. | |
| 2005/0260495 A1 * | 11/2005 | Onnerud et al. | 429/231.1 |
| 2007/0212605 A1 * | 9/2007 | Yamaki et al. | 429/221 |
| 2009/0050841 A1 * | 2/2009 | Sasaki et al. | 252/182.1 |
| 2009/0104526 A1 * | 4/2009 | Tanino et al. | 429/209 |
| 2009/0104531 A1 * | 4/2009 | Tanino et al. | 429/223 |

FOREIGN PATENT DOCUMENTS

| | | |
|---|---|---|
| CN | 1416189 A | 5/2003 |
| EP | 1267431 A1 | 12/2002 |
| JP | 05-062681 A | 3/1993 |
| JP | 09-055210 A | 2/1997 |
| JP | 9-251854 A | 9/1997 |
| JP | 09-251854 A | 9/1997 |
| JP | 11-135119 A | 5/1999 |
| JP | 11-149925 A | 6/1999 |
| JP | 11-317230 A | 11/1999 |
| JP | 2001-266876 A | 9/2001 |
| JP | 2002-124262 A | 4/2002 |
| JP | 2002-158011 A | 5/2002 |
| JP | 2003-7299 A | 1/2003 |
| JP | 2003-500318 A | 1/2003 |
| JP | 2003-109599 A | 4/2003 |
| JP | 2005-302507 A | 10/2005 |
| JP | 2005-310744 A | 11/2005 |
| WO | 97/49136 A1 | 12/1997 |
| WO | 2005/114768 A1 | 12/2005 |

* cited by examiner

*Primary Examiner*—Douglas M C Ginty
(74) *Attorney, Agent, or Firm*—Sughrue Mion, PLLC

(57) ABSTRACT

The present invention provides a positive-electrode active material powder, which comprises a granular material (A) capable of doping/dedoping lithium ions and a deposit (B) placed on the surface of the material in a granular or layered form (herein, the material (A) and the deposit (B) are not the same), the percentage of [volumetric sum of particles having a particle diameter of 1 μm or less]/[volumetric sum of entire particles] being 5% or less.

10 Claims, No Drawings

POSITIVE-ELECTRODE ACTIVE MATERIAL POWDER

TECHNICAL FIELD

The present invention relates to a positive-electrode active material powder.

BACKGROUND ART

A positive-electrode active material powder is used for nonaqueous secondary battery such as a lithium secondary battery. The nonaqueous secondary battery is practically used for a power source for cellular phones and laptop computers, and the attempts are made to apply the nonaqueous secondary battery for applications of middle size and large size such as automobiles and electric power storage units.

Japanese Unexamined Patent Publication No. 2002-158011 discloses, as a conventional positive-electrode active material powder, a positive-electrode active material powder containing a core including a lithium compound constituting secondary particles having an average particle diameter of from 1 µm or more and less than 10 µm, and a surface treated layer containing a compound such as an oxide containing a coating element formed on the core.

DISCLOSURE OF THE INVENTION

While the nonaqueous secondary battery produced using a conventional positive-electrode active material powder is free from problems regarding safety in case of external and internal short-circuits, it does not have a sufficient discharge capacity. An object of the present invention is to provide a positive-electrode active material powder useful for an aqueous secondary battery, which can exhibit a higher discharge capacity without impairing safety.

Under these circumstances, the present inventors have intensively studied and found that a nonaqueous secondary battery obtained by using a specific positive-electrode active material powder can exhibit a higher discharge capacity without impairing safety, and thus the present invention has been completed.

That is, the present invention provides the following positive-electrode active material powders, and a method for producing the same.

<1> A positive-electrode active material powder, which comprises a granular material (A) capable of doping/dedoping lithium ions and a deposit (B) placed on the surface of the material in a granular or layered form (herein, the material (A) and the deposit (B) are not the same), the percentage of [volumetric sum of particles having a particle diameter of 1 µm or less]/[volumetric sum of entire particles] being 5% or less.

<2> The positive-electrode active material powder according to <1>, wherein the average particle diameter is from 2 µm or more and 20 µm or less on a volume basis of the positive-electrode active material powder.

<3> The positive-electrode active material powder according to <1> or <2>, wherein the BET specific surface area of the positive-electrode active material powder is from 0.1 to 1.0 $m^2/g$.

<4> The positive-electrode active material powder according to any one of <1> to <3>, wherein the granular material (A) capable of doping/dedoping lithium ions is a granular compound (A) represented by the formula of $L_xNi_{1-y}M_yO_2$ (wherein x is a value within a range from 0.9 or more and 1.2 or less; y is a value within a range from 0 or more and 0.9 or less; and M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd).

<5> The positive-electrode active material powder according to <4>, wherein M in the compound (A) is at least one element selected from the group consisting of Al, Mn, Fe, Ti, Cu, V and Co.

<6> The positive-electrode active material powder according to any one of <1> to <5>, wherein the deposit (B) is a compound (B) containing at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Pd, Cu, Ag, Zn and Cd.

<7> The positive-electrode active material powder according to <6>, wherein the compound (B) is a compound containing at least one element selected from the group consisting of Al, Mn and Co.

<8> A method for producing a positive-electrode active material powder, which comprises the following steps of (a) to (d) in this order:

(a) a step of mixing a lithium compound, a nickel compound and a compound of an element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd), grinding the mixture and then calcining the ground mixture at 700° C. or higher and 1,200° C. or lower to obtain the compound (A);

(b) a step of grinding the compound (A) to obtain a granular compound (A);

(c) a step of placing the compound (B) on the particle surface of the granular compound (A) in a granular or layered form to obtain a granular positive electrode active material; and (d) a step of removing 5 to 40% by weight of particles out of the granular positive electrode active material, accumulated from the finer particle side.

<9> A positive electrode for nonaqueous secondary battery, which comprises the positive-electrode active material powder according to any one of <1> to <7>.

<10> A nonaqueous secondary battery, which comprises the positive electrode for nonaqueous secondary battery according to <9>.

BEST MODE FOR CARRYING OUT THE INVENTION

The present invention provides a positive-electrode active material powder, which comprises a granular material (A) capable of doping/dedoping lithium ions and a deposit (B) placed on the surface of the material in a granular or layered form (herein, the material (A) and the deposit (B) are not the same), the percentage of [volumetric sum of particles having a particle diameter of 1 µm or less]/[volumetric sum of entire particles] being 5% or less. It is preferred that the percentage of [volumetric sum of particles having a particle diameter of 1 µm or less]/[volumetric sum of entire particles] is 3% or less, and more preferably 2% or less, so as to further increase the discharge capacity of the nonaqueous secondary battery. Herein, as the values of [volumetric sum of particles having a particle diameter of 1 µm or less] and [volumetric sum of entire particles], values measured by a particle diameter distribution analyzer using a laser diffraction scattering method are used.

In the present invention, the material (A) capable of doping/dedoping lithium ions is usually a granular compound represented by the formula shown below, and the compound is referred to as a granular compound (A) in the present invention:

$$Li_xNi_{1-y}M_yO_2$$

(wherein x is a value within a range from 0.9 or more and 1.2 or less; y is a value within a range from 0 or more and 0.9 or less; and M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd).

It is preferred that M of the compound (A) represents at least one element selected from a group consisting of Al, Mn, Fe, Ti, Cu, V and Co. More preferably, the compound (A) is a granular compound represented by the formula (1) or (2) shown below so as to further increase the discharge capacity of the nonaqueous secondary battery:

$$Li_{x1}Ni_{1-y1}M^1_{y1}O_2 \qquad (1)$$

(wherein x1 and y1 satisfy the relations: $0.9 \leq x1 \leq 1.2$ and $0 \leq y1 \leq 0.5$, respectively; and $M^1$ is Co), and $$Li_{x2}Ni_{1-y2}M^2_{y2}O_2 \qquad (2)$$

(wherein x2 and y2 satisfy the relations: $0.9 \leq x2 \leq 1.2$ and $0.3 \leq y2 \leq 0.9$, respectively; and $M^2$ is Mn and Co).

In the present invention, the deposit (B) is not the same as the material (A). In the present invention, the deposit (B) is usually a compound containing at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Pd, Cu, Ag, Zn and Cd. The compound is referred to as a compound (B) in the present invention.

In the present invention, the compound (B) is not the same as the compound (A). The compound (B) is preferably a compound containing at least one element selected from the group consisting of Al, Mn and Co, and is more preferably a compound containing Al, in view of ease of the production of the positive electrode active material and an enhancement of safety of the resulting battery.

Examples of the compound (B) include oxides, hydroxides, oxyhydroxides, carbonates, nitrates and organic acid salts containing the above elements, or mixtures thereof. Among these, oxides, hydroxides, oxyhydroxides, carbonates or mixtures thereof are preferred, and oxides and/or hydroxides are more preferred, in view of ease of the production.

In the present invention, the average particle diameter of the positive-electrode active material powder is preferably from 2 μm or more and 20 μm or less, more preferably from 5 μm or more and 15 μm or less, further more preferably from 6 μm or more and 12 μm or less, and particularly preferably from 8 μm or more and 12 μm or less on a volume basis of the positive-electrode active material powder. When the particle diameter is less than 2 μm, there may occur a problem in the operability of the powder. When the particle diameter is more than 20 μm, it may sometimes become difficult to produce a nonaqueous secondary battery due to its size. Herein, as the value of the average particle diameter on a volume basis, a value measured by a particle diameter distribution analyzer using a laser diffraction scattering method is used.

In the present invention, the BET specific surface area of the positive-electrode active material powder is preferably from 0.1 to 1.0 m²/g, and more preferably from 0.5 to 0.9 m²/g. When the BET specific surface area is more than 1.0 m²/g, there may occur a problem in the operability of the powder. When the BET specific surface area is less than 0.1 m²/g, it may sometimes become difficult to produce a nonaqueous secondary battery.

In the present invention, that the deposit (B) is placed on the surface of the granular material (A) in a granular or layered form means that the deposit (B) is adhered on the surface of the granular material (A) in a granular or layered form. This adhesion may be a chemical bond or physical adsorption between the (A) and the (B). The (B) may be adhered on a portion of the surface of the (A). The (B) may be adhered on the surface of the (A) in a granular form, or may coat the surface of the (A) in a granular or layered form. It is preferred that the (B) coats the entire surface of the (A). When the (B) coats the surface of the (A) in a granular or layer form, the thickness of the coating is preferably from 1 nm to 200 nm, and more preferably from 5 nm to 50 nm, in consideration of high capacity performance of the nonaqueous secondary battery.

In the present invention, the particle diameter of the deposit (B) is preferably smaller than that of the material (A), and the BET specific surface area of the deposit (B) is at least 5 times, and more preferably at least 20 times, larger than that of the material (A) so as to efficiently coat the granular surface of the material (A).

Hereinafter, the method for producing a positive electrode active powder material of the present invention will be described below by way of the case where the material (A) is the compound (A) and the deposit (B) is the compound (B), which is a typical example of the positive-electrode active material powder of the present invention.

The positive-electrode active material powder of the present invention can be produced according to the following steps (a) to (d) in this order:

(a) a step of mixing a lithium compound, a nickel compound and a compound of an element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd), grinding the mixture and then calcining the ground mixture at 700° C. or higher and 1,200° C. or lower to obtain the compound (A);

(b) a step of grinding the compound (A) to obtain a granular compound (A);

(c) a step of placing the compound (B) on the particle surface of the granular compound (A) in a granular or layered form to obtain a granular positive electrode active material; and (d) a step of removing 5 to 40% by weight of particles out of the granular positive electrode active material, accumulated from the finer particle side.

The compound (A) is produced by mixing and grinding a lithium compound, a nickel compound and a compound of the element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd), which can be converted into the compound (A) by calcining, and calcining the resulting mixture of the metal compounds at 700° C. or higher and 1,200° C. or lower.

As the lithium compound, the nickel compound and the compound of the element M, oxides of lithium, nickel and the element M, or those which can be converted into oxides by decomposition and/or oxidation at high temperature, such as hydroxide, carbonate, nitrate, halide and oxalate can be used.

Mixing and grinding of the lithium compound, the nickel compound and the compound of the element M can be carried out by either dry mixing or wet mixing. However, dry mixing is preferable, since it is a simple and easy way. Dry mixing can be carried out using a V-type mixer, a W-type mixer, a ribbon mixer, a drum mixer, a powder mixer being equipped with a screw and a stirring blade, a ball mill, a vibration mill, or combinations thereof.

The calcining temperature in preparing the compound (A) is preferably 700° C. or higher and 800° C. or lower when the compound (A) is represented by the formula (1), while preferably 800° C. or higher and 1,100° C. or lower when the compound (A) is represented by the formula (2).

In place of the step (a), the following step (a') may be used:

(a') a step of using a complex compound of nickel and the element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd), mixing a lithium compound with the complex compound, grinding the mixture, and then calcining the ground mixture at 700° C. or higher and 1,200° C. or lower to obtain the compound (A).

Examples of the complex compound in the step (a') include a complex hydroxide, a complex carbonate and a complex oxalate. These compounds are produced by a method in which an aqueous solution containing nickel and the element M is contacted with an aqueous alkali solution, an aqueous carbonate solution or an aqueous oxalate solution to form a precipitate, that is, a so-called coprecipitation method.

After calcining, the resulting compound (A) is ground to obtain a granular compound (A). As the grinder, such as a vibration mill, a jet mill and a dry ball mill can be used.

Then, the compound (B) is placed on the particle surface of the granular compound (A) in a granular or layered form to obtain a granular positive-electrode active material powder.

With regard to the amount of the compound (B), the element such as Al constituting the compound is preferably 0.005 to 0.15 part by mol to the compound (A), and is more preferably from 0.02 to 0.10 part by mol to the compound (A), in order to obtain an active material which provides a non-aqueous secondary battery having excellent balance between discharge capacity, cycle performance and safety.

From an industrial point of view, it is preferred to employ dry mixing in the process of placing the compound (B) on the particle surface of the granular compound (A) in a granular or layered form to obtain a granular positive electrode active material. The dry mixing method is not particularly limited and can be carried out simply, for example, by placing a predetermined amount of a core material and a compound containing an element A in a container, followed by mixing with shaking. It can also be carried out by a device that is usually used industrially, such as a V-type, W-type or double cone-type mixer; or a powder mixer, a ball mill or a vibration mill internally equipped with a screw and a stirring blade.

It is preferred to mix until an aggregate of the compound (B) cannot be visually observed since insufficient mixing may cause deterioration of cyclability and safety of the nonaqueous secondary battery produced using the finally obtained positive-electrode active material powder. It is preferred to add at least one mixing process using a medium in the dry mixing steps, since it tends to give good mixing efficiency, strong adhesion of the compound (B) to the particle surface of the compound (A), and a positive-electrode active material powder which provides a nonaqueous secondary battery having excellent cycle performance and safety.

After mixing, calcining may be carried out so as to enable the compound (B) to more strongly adhere on the particle surface of the compound (A). Calcining may be carried out at the temperature and the retention time at which the crystal structure of the compound (A) is not damaged. Examples of the atmosphere for calcining include atmospheric air, oxygen, nitrogen, carbon dioxide, steam, nitrogen oxide, hydrogen sulfide, or a gas mixture thereof, or reduced pressure.

Then, 5 to 40% by weight of particles, accumulated from the finer particle side, is removed from the resulting granular positive electrode active material to obtain a positive-electrode active material powder of the present invention. The amount of particles to be removed is preferably from 10 to 30% by weight out of the granular positive electrode active material, accumulated from the finer particle side. When the value is less than 5% by weight, the effect of improving the discharge capacity of the resulting nonaqueous secondary battery is deteriorated. When the value is more than 40% by weight, it may not be preferred in view of cost.

Removal of the particles from the finer particle side is carried out by screening or classification, and classification is preferred. Examples of the classification method include sieving, dry classification, wet classification and sedimentation separation. Among these, dry classification is preferred. The device for performing the classification is exemplified by a wind power classifier, centrifugal classifier and gravity classifier.

A nonaqueous secondary battery can be produced by using the positive-electrode active material powder of the present invention. The nonaqueous secondary battery described herein includes, for example, a lithium secondary battery described hereinbelow.

A method for producing a positive electrode for nonaqueous secondary battery (hereafter it may be referred to as a positive electrode) and a nonaqueous secondary battery using the positive-electrode active material powder of the present invention will be described below by way of the lithium secondary battery as an example of the nonaqueous secondary battery. The lithium secondary battery includes a positive electrode comprising a positive electrode mixture and a positive electrode collector; an anode comprising a negative electrode material and a negative electrode collector; an electrolyte; an organic solvent; and a separator.

The positive electrode mixture includes, for example, those containing a positive-electrode active material powder of the present invention, a carbonaceous material as a conductive material, and a thermoplastic resin as a binder. Examples of the carbonaceous material include natural graphite, artificial graphite, cokes and carbon black. As the conductive material, these materials can be used alone, or artificial graphite and carbon black may be used in combination.

Examples of the thermoplastic resin include polyvinylidene fluoride (hereafter it may be referred to as PVDF), polytetrafluoroethylene (hereafter it may be referred to as PTFE), an ethylene tetrafluoride/propylene hexafluoride/vinylidene fluoride-based copolymer, a propylene hexafluoride/vinylidene fluoride-based copolymer, and an ethylene tetrafluoride/perfluorovinyl ether-based copolymer. These thermoplastic resins may be used alone, or two or more kinds of them may be used in combination. These binders can be used in a form of a solution prepared by dissolving the compound in an organic solvent such as 1-methyl-2-pyrrolidone (hereafter it may be referred to as NMP).

It is preferred to use a fluororesin and polyolefin resin as the binder in combination with the positive-electrode active material powder of the present invention so as to adjust the content of the fluororesin in the positive electrode mixture within a range from 1 to 10% by weight and to adjust the content of the polyolefin resin within a range from 0.1 to 2% by weight since the binding property with the collector and safety of the lithium secondary battery against the external heating typified by a heating test can be further improved.

As the positive electrode collector, Al, Ni and stainless steel can be used. Among these, Al is preferred since it is easy to form into a thin film and is cheap. Examples of the method of supporting a positive electrode mixture on the positive electrode collector include a pressure molding method, and a method of adding solvent to form a paste, applying the paste on the collector, and fixing to the collector through drying and pressing.

As the anode material, for example, a material capable of doping/dedoping lithium metal, a lithium alloy or lithium ions can be used. Examples of the material capable of doping/dedoping lithium ions include carbonaceous materials such as natural graphite, artificial graphite, cokes, carbon black, pyrolytic carbon, carbon fiber and a fired organic polymer compound; and chalcogen compounds capable of doping/dedoping lithium ions at a lower electric potential than that of the positive electrode, such as oxide and sulfide. It is preferred to use the carbonaceous material containing a graphite material as a main component, such as natural graphite and artificial graphite, since a lithium secondary battery having a high energy density can be obtained because of its high potential flatness and low average discharge potential when used in combination with a positive electrode.

When used in combination with a liquid electrolyte, it is preferred to use an anode containing polyethylene carbonate in the case where the liquid electrolyte does not contain ethylene carbonate, since cycle performance and large current discharge characteristics of the lithium secondary battery are improved.

The carbonaceous material can be in any form, for example, flake like natural graphite, sphere like mesocarbon micro-beads, fiber like graphitized carbon fiber, and aggregate of fine powder. A thermoplastic resin can be added as the binder, if necessary. Examples of the thermoplastic resin include PVDF, polyethylene and polypropylene.

Examples of the chalcogen compound used as the anode material, such as oxide and sulfide, include crystalline or amorphous oxide composed mainly of the Group 13, 14 or 15 elements in the Periodic Table, such as an amorphous compound composed mainly of a tin compound. To the chalcogen compounds, a carbonaceous material as a conductive material, and a thermoplastic resin as a binder can also be added, if necessary.

As the negative electrode collector, for example, Cu, Ni or stainless steel can be used, and Cu is preferred in the lithium secondary battery, since it is less likely to form an alloy with lithium and is easily formed into a thin film. Examples of the method of supporting a mix containing an anode active material on the negative electrode collector include a pressure molding method, and a method of using solvent to form a paste, applying the paste on the collector, and fixing to the collector through drying and pressing.

As the separator, for example, there can be used materials comprising olefin resins such as a fluororesin, polyethylene and polypropylene, nylon and aromatic aramid in the form of a porous material, a nonwoven fiber or a woven fiber. The thickness of the separator is preferably as thin as possible, as long as the mechanical strength is maintained, and is preferably from about 10 to 200 μm, since a volume energy density as a battery increases and internal resistance decreases.

As the separator, a layer with a shutdown function is used. It is more preferred that the separator is a multilayered porous film having a layer with the shutdown function and a heat resistant porous layer made of a heat resistant resin so as to enhance safety of the battery.

The layer with the shutdown function is not particularly limited as long as it has a shutdown function, and is usually a porous layer made of a thermoplastic resin. Since it is preferred that the shutdown layer is substantially converted into a nonporous layer at a temperature of 80 to 180° C., the preferred thermoplastic resin constituting the shutdown layer is a thermoplastic resin which is softened at 80 to 180° C. with the pores blocked, and is not dissolved in the electrolyte. Specific examples of the resin include polyolefin and thermoplastic polyurethane. The polyolefin is more preferably at least one kind of a thermoplastic resin selected from polyethylenes such as low density polyethylene, high density polyethylene and ultrahigh molecular weight polyethylene, and polypropylene.

It is preferred that the pore size or a spherical diameter (hereafter, it may be referred to as a pore diameter) when the pore is approximated to a spherical shape, of the shutdown layer is 3 μm or less, more preferably 1 μm or less. Porosity of the shutdown layer is preferably from 30 to 80% by volume, and more preferably from 40 to 70% by volume. The thickness thereof is preferably from 3 to 30 μm, and more preferably from 5 to 20 μm.

The heat resistant porous layer preferably comprises a heat resistant resin. In the present invention, the preferred heat resistant resin constituting the heat resistant porous layer is at least one heat resistant resin selected from resins having a deflection temperature as measured in accordance with JIS J 7207 of 100° C. or higher under a load of 18.6 kg/cm$^2$. Specific examples of the resin having a deflection temperature under load of 100° C. or higher include polyimide, polyamideimide, aramid, polycarbonate, polyacetal, polysulfone, polyphenyl sulfide, polyether ether ketone, aromatic polyester, polyether sulfone and polyetherimide.

The pore size, or diameter of the pore of the heat resistant porous layer is preferably 3 μm or less, and more preferably 1 μm or less. Porosity of the heat resistant porous layer is preferably from 30 to 80% by volume, and more preferably from 40 to 70% by volume. The thickness is preferably from 1 to 20 μm, and more preferably from 2 to 10 μM.

The heat resistant porous layer may contain a ceramic powder comprising electrically insulated metal oxide, metal nitride, or metal carbide. As the ceramic powder, for example, powders of alumina, silica, titanium dioxide and zirconium oxide are preferably used. These ceramic powders can be used alone, or can be used in combination of two or more kinds.

As the electrolyte, for example, there can be used a known one selected from a nonaqueous electrolyte solution prepared by dissolving a lithium salt in an organic solvent, and a solid electrolyte. Examples of the lithium salt include one or a mixture of two or more of $LiClO_4$, $LiPF_5$ $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, a lower aliphatic carboxylic acid lithium salt, $LiAlCl_4$ and $LiB(C_2O_4)_2$.

Examples of the organic solvent include carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitrites such as acetonitrile and butyronitrile; amides such as N,N-dimethylformamide and N,N-dimethylacetoamide; carbamates such as 3-methyl-2-oxazoline; sulfur-containing compounds such as sulfolane, dimethyl sulfoxide and 1,3-propanesultone; and those in which a fluorine substituent group is further introduced into the above organic solvents. Usually, two or more kinds of these organic solvents are used in combination. Among these organic solvents, a solvent mixture containing carbonates is preferred and a solvent mixture of cyclic carbonate and acyclic carbonate, or a solvent mixture of cyclic carbonate and ethers are more preferred.

The solvent mixture of cyclic carbonate and acyclic carbonate is preferably a solvent mixture containing ethylene carbonate, dimethyl carbonate and ethylmethyl carbonate, since it gives a lithium secondary battery having a wide range of operation temperature and excellent load characteristics, and is hardly decomposable even when a graphite material such as natural or artificial graphite is used as an anode active material.

It is preferred to use an electrolyte containing a lithium salt containing fluorine, such as $LiPF_6$, and/or an organic solving having a fluorine substituent group, since the positive-electrode active material powder obtained in the present invention has a layered rock-salt crystal structure, and exerts an excellent safety improvement effect when it contains Al. A solvent mixture containing ethers having a fluorine substituent group, such as pentafluoropropylmethyl ether and 2,2,3,3-tetrafluoropropyldifluoromethyl ether, and dimethyl carbonate is more preferred, since it gives a lithium secondary battery having excellent large current discharge characteristics.

As the solid electrolyte, for example, a polymer electrolyte, such as a polyethylene oxide-based polymer compound and a polymer compound containing at least one kind of polyorganosiloxane or polyoxyalkylene chains can be used. It is also possible to use a so-called gel-type electrolyte in which polymer retains a nonaqueous electrolyte solution. It is also possible to use sulfide-based electrolyte, such as $Li_2S$—$SiS_2$, $Li_2S$—$GeS_2$, $Li_2S$—$P_2S_5$ and $Li_2S$—$B_2S_3$, or an inorganic compound electrolyte containing sulfide, such as $Li_2S$—$SiS_2$—$Li_3PO_4$ and $Li_2S$—$SiS_2$—$Li_3SO_4$, in terms of enhancing the safety of the litium secondary battery.

The shape of the nonaqueous secondary battery of the present invention is not particularly limited, and the nonaqueous secondary battery may be a paper-type, coin-type, cylinder-type or square-type nonaqueous secondary battery. It is also possible to use, as an outer packaging, a pouched package comprising a laminate sheet containing aluminum without using a metal hard case serving as a negative or positive terminal as well.

The present invention will be illustrated in detail below by way of examples. The positive electrode and battery were produced by the following procedures unless otherwise specified.

A solution of PVDF in 1-methyl-2-pyrrolidone (hereafter it may be referred to as NMP) as a binder was added to a mixture of a positive-electrode active material powder and a conductive material of acetylene black so as to attain the following composition with a ratio, active material:conductive material:binder of 86:10:4 (by weight), followed by kneading to obtain a paste. The paste was applied on a #100 stainless steel mesh serving as a collector, and then vacuum dried at 150° C. for 8 hours to obtain a positive electrode.

An electrolyte solution prepared by dissolving 1 mol/L of $LiPF_6$ in a mixed solution of ethylene carbonate (hereafter it may be referred to as EC), dimethyl carbonate (hereafter it may be referred to as DMC) and ethylmethyl carbonate (hereafter it may be referred to as EMC) in a ratio of 30:35:35 (hereafter it may be referred to as $LiPF_6$/EC+DMC+EMC), a porous polypropylene film as a separator, and metal lithium as a counter electrode (anode) were combined with the resulting positive electrode to obtain a plate-shaped battery.

Example 1

(1) Preparation of Positive-Electrode Active Material Powder

Lithium hydroxide ($LiOH.H_2O$; manufactured by Honjo Chemical Corporation, ground product, average particle diameter of 10-25 μm), nickel hydroxide ($Ni(OH)_2$, manufactured by Kansai Catalyst Co., Ltd., product name; Nickel Hydroxide No. 3) and cobalt oxide ($Co_3O_4$, manufactured by Seido Chemical Industry Co., Ltd., product name, cobalt oxide (HCO)) were weighed in such a way that each metal has an atomic ratio Li:Ni:Co of 1.05:0.85:0.15, followed by mixing using a Loedige mixer (manufactured by Matsubo Co., Ltd., model: M-20) and further drying at 120° C. for 10 hours. The resulting dried product was finely ground and mixed under the following conditions using a dynamic mill (manufactured by Mitsui Mining Co., Ltd., model: MYD5-XA) to obtain a metal compound mixture 1.

| | |
|---|---|
| Grinding media: | 5Φ High Alumina (6.1 kg) |
| Revolution number of agitator shaft: | 650 rpm |
| Supply of dried product: | 12.0 kg/h |

The resulting metal element compound mixture 1 was placed in a muffle furnace and calcined at 730° C. for 15 hours in an oxygen gas flow to obtain a compound (A1). The compound (A1) was ground in a dry ball mill using a Φ15 mm steel ball coated with nylon as a grinding medium to obtain a granular compound (A1).

In a dry ball mill, 900 g of the granular compound (A1) and 37.6 g of aluminum oxide (manufactured by Nippon Aerosil Co., Ltd., primary particle diameter of 13 nm, product name: Alumina C) were mixed, and then allowed to stand in a thermo-hygrostat, containing a carbon dioxide gas introduced therein controlled at a temperature of 50° C. and a relative humidity of 60%, for 3.5 hours. The mixture was further allowed to stand at room temperature under a vacuum condition for one hour and then fired at 725° C. under an oxygen atmosphere for one hour to obtain a granular positive electrode active material 1. Then, the granular positive electrode active material 1 was fed to a spedic classifier, forced vortex type of dry air classifier (manufactured by Sheishin Enterprise Co., Ltd., model; SPC-250) under the conditions of a feed quantity of 0.5 kg/h through a feeder to the classifier, a rotor revolution number of 2,500 μm, a blower air quantity of 2 m³/min, a distributed pressure of 3 kg/cm² and an ejector pressure of 1.5 kg/cm² to obtain a positive-electrode active material powder 1. At this point, the finer particles removed from the granular positive electrode active material 1 is 26% by weight, accumulated from the finer particle side.

(2) Evaluation of Charge/Discharge Performances when Used as Positive Electrode of Lithium Secondary Battery A plate-shaped battery was produced by using the positive electrode active material 1 as a positive electrode. A charge/discharge test was carried out under the following conditions by way of constant current and voltage charge and constant current discharge. Maximum charging voltage of 4.3 V; Charging time of 8 hours; Charging current of 0.8 mA/cm²; Minimum discharging voltage of 3.0 V; Discharging current of 0.8 mA/cm²

The charge capacity and discharge capacity in the first cycle were high at 229 mAh/g, and 193 mAh/g, respectively.

(3) Measurement of Particle Diameter Distribution of Positive-Electrode Active Material Powder Using an aqueous 0.2 wt % solution of sodium hexametaphosphate as a dispersion medium, particle diameter distribution of the positive-electrode active material powder 1 was measured by a laser diffraction particle diameter distribution analyzer (Mastersizer 2000, manufactured by Malvern). As the result, the average particle diameter was 11.6 μm based on the volume. The percentage of [Volumetric sum of particles having a particle diameter of 1 μm or less]/[Volumetric sum of entire particles] was 1.3%.

(4) Measurement of BET Specific Surface Area (BET One Point Measurement)

The BET specific surface area of the positive-electrode active material powder 1 was 0.69 $m^2/g$ in a measurement by a BET specific surface area measuring device (Macsorb HM model-1208, manufactured by Mountech Co., Ltd.).

(5) Measurement of Differential Scanning Calorie

Measurement of differential scanning calorie was carried out in order to evaluate the safety of the positive-electrode active material powder 1 in a fully charged state. First, a positive electrode was prepared from the positive-electrode active material powder 1, and then a battery was prepared. Constant current and voltage charge was carried out under such conditions as maximum charging voltage of 4.3 V, charging time of 20 hours and charging current 0.4 $mA/cm^2$. A plate-shaped battery in a fully charged state was disassemble in a glove box under argon atmosphere. The positive electrode taken out of the box was washed with DMC, and then a mixture 1 of the positive-electrode active material powder and a conductive material was recovered. The mixture of 0.8 g of the positive-electrode active material powder and the conductive material, and 1.5 micro-liter of a nonaqueous electrolyte solution (a mixture solution obtained by adding $LiPF_6$ in an amount to be 1.3 mol/L to the solution having a ratio of ethylene carbonate:vinylene carbonate:dimethyl carbonate:ethylmethyl carbonate=15.2:4.8:9.5:70.5 by vol %) were sealed in an airtight stainless steel vessel. Using α-alumina as a reference material, measurement of the airtight stainless steel vessel was conducted with a differential scanning calorimeter (manufactured by SII nanotechnology Inc., model; DSC200) at a heating rate of 10° C./min in a range from room temperature to 400° C., to obtain DSC signals. The resulting DSC signals were integrated. The calorific value to be obtained was 480 mJ/mg.

Example 2

The granular positive electrode active material 1 prepared in Example 1 was fed to a spedic classifier, forced vortex type of dry air classifier (manufactured by Sheishin Enterprise Co., Ltd., model; SPC-250), under the conditions of a supply quantity of 0.5 kg/h through a feeder to the classifier, rotor revolution number of 3,500 rpm, blower air quantity of 2 $m^3$/min, distributed pressure of 3 $kg/cm^2$ and ejector pressure of 1.5 $kg/cm^2$, to obtain a positive-electrode active material powder 2. At this point, the finer particles removed from the granular positive electrode active material 1 is 12% by weight, accumulated from the finer particle side.

The charge/discharge test was carried out using the positive-electrode active material powder 2, by way of constant current and voltage charge and constant current discharge, under the same conditions as in Example 1. The charge capacity and discharge capacity at the first cycle were 228 mAh/g and 192 mAh/g, respectively.

In the same manner as in Example 1, measurement of the particle diameter distribution was carried out for the positive-electrode active material powder 2. The average particle diameter was 10.5 μm based on the volume. The percentage of [Volumetric sum of particles having a particle diameter of 1 μm or less]/[Volumetric sum of entire particles] was 1.6%.

In the same manner as in Example 1, the BET specific surface area was measured for the positive-electrode active material powder 2. It was 0.74 $m^2/g$.

In the same manner as in Example 1, measurement of differential scanning calorie was carried out for the positive-electrode active material powder 2. The calorific value to be obtained was 471 mJ/mg.

Comparative Example 1

Lithium hydroxide ($LiOH.H_2O$; manufactured by Honjo Chemical Corporation, ground product, average particle diameter of 10-25 μm), nickel hydroxide ($Ni(OH)_2$; manufactured by Kansai Catalyst Co., Ltd., product name; Nickel Hydroxide No. 3) and cobalt oxide ($CO_3O_4$; manufactured by Seido Chemical Industry Co., Ltd., product name; cobalt oxide (HCO)) were weighed so as to attain an atomic ratio of metals Li:Ni:Co of 1.05:0.85:0.15, followed by mixing using a Lödige mixer (manufactured by Matsubo Co., Ltd., model; M-20) and further drying at 120° C. for 10 hours. The resulting dried product was finely ground and mixed under the following conditions using a dynamic mill (manufactured by Mitsui Mining Co., Ltd., model: MYD5-XA) to obtain a metal compound mixture 2.

| | |
|---|---|
| Grinding media: | 5Φ High Alumina (6.1 kg) |
| Revolution number of agitator shaft: | 650 rpm |
| Supply of dried product: | 7.8 kg/h |

The resulting metal element compound mixture 2 was placed in a muffle furnace and then fired at 730° C. for 15 hours under oxygen atmospheric current to obtain a compound (A2). The compound (A2) was ground in a dry ball mill using a (15 mm steel ball coated with nylon as a grinding medium to obtain a granular compound (A2).

In a dry ball mill, 900 g of the granular compound (A2) and 37.6 g of aluminum oxide (manufactured by Nippon Aerosil Co., Ltd., primary particle diameter of 13 nm, product name; Alumina C) were mixed, and then allowed to stand in a thermo-hygrostat, containing a carbon dioxide gas introduced therein controlled at a temperature of 50° C. and a relative humidity of 70%, for 30 minutes. The mixture was further allowed to stand at room temperature under a vacuum condition for one hour and then fired at 720° C. under an oxygen atmosphere for one hour to obtain a granular positive electrode active material 2.

A plate-shaped battery was produced by using the granular positive-electrode active material powder 2, and the charge/discharge test was carried out, by way of constant current and voltage charge and constant current discharge, under the same conditions as Example 1. The charge capacity and discharge capacity at the first cycle were 217 mAh/g and 185 mAh/g, respectively.

In the same manner as in Example 1, measurement of the particle diameter distribution was carried out for the granular positive electrode active material 2. As the result, the average particle diameter was 7.4 µm based on the volume. The percentage of [Volumetric sum of particles having a particle diameter of 1 µm or less]/[Volumetric sum of entire particles] was 11.4%.

In the same manner as in Example 1, the BET specific surface area was measured for the granular positive electrode active material 2. It was 1.8 m$^2$/g.

In the same manner as in Example 1, measurement of differential scanning calorie was carried out for the granular positive electrode active material 2. The calorific value to be obtained was 442 mJ/mg.

The positive-electrode active material powder of the present invention is produced by a simple operation, and the nonaqueous secondary battery produced by using the powder as the positive electrode for the nonaqueous secondary battery can exhibit higher discharge capacity without impairing safety, and thus the present invention is industrially important.

The invention claimed is:

1. A positive-electrode active material powder, which comprises a granular material (A) capable of doping/dedoping lithium ions and a deposit (B) placed on the surface of the material in a granular or layered form (herein, the material (A) and the deposit (B) are not the same), the percentage of [volumetric sum of particles having a particle diameter of 1 µm or less]/[volumetric sum of entire particles] being 5% or less,
wherein the positive-electrode active material powder has an average particle diameter of from 2 µm to 20 µm, inclusive, on a volume basis,
wherein the granular material (A) is the oxidized mixture of Li, Ni, and M, in which M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn, and Cd, and
wherein the deposit (B) is a compound containing at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Pd, Cu, Ag, Zn, and Cd.

2. The positive-electrode active material powder according to claim 1, wherein the BET specific surface area of the positive-electrode active material powder is from 0.1 to 1.0 m$^2$/g.

3. The positive-electrode active material powder according to claim 1, wherein the granular material (A) capable of doping/dedoping lithium ions is a granular compound (A) represented by the formula of $Li_xNi_{1-y}M_yO_2$ (wherein x is a value within a range from 0.9 or more and 1.2 or less; y is a value within a range from 0 or more and 0.9 or less; and M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd).

4. The positive-electrode active material powder according to claim 3, wherein M in the compound (A) is at least one element selected from the group consisting of Al, Mn, Fe, Ti, Cu, V and Co.

5. The positive-electrode active material powder according to claim 1, wherein the compound (B) is a compound containing at least one element selected from the group consisting of Al, Mn and Co.

6. A method for producing a positive-electrode active material powder, which comprises the steps of (a) to (d) in this order:
(a) mixing a lithium compound, a nickel compound and a compound of an element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd) to obtain a mixture,
grinding the mixture and then
calcining the ground mixture at 700° C. or higher and 1,200° C. or lower to obtain a compound (A);
(b) grinding the compound (A) to obtain a granular compound (A);
(c) placing a compound (B) on the particle surface of the granular compound (A) in a granular or layered form to obtain a granular positive electrode active material; and
(d) removing 5 to 40% by weight of particles out of the granular positive electrode active material, accumulated from the finer particle side,
wherein the deposit (B) is a compound containing at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Pd, Cu, Ag, Zn, and Cd,
wherein the percentage of [volumetric sum of particles having a particle diameter of 1 µm or less]/[volumetric sum of entire particles] being 5% or less, and
wherein the positive-electrode active material powder has an average particle diameter of from 2 µm to 20 µm, inclusive, on a volume basis.

7. A positive electrode for nonaqueous secondary battery, which comprises the positive-electrode active material powder according to claim 1.

8. A nonaqueous secondary battery, which comprises the positive electrode for nonaqueous secondary battery according to claim 7.

9. The method according to claim 6, wherein the step (d) is the step of removing 10 to 30% by weight of particles out of the granular positive electrode active material, accumulated from the finer particle side.

10. A method for producing a positive-electrode active material powder described in claim 1, which comprises the steps of (a) to (d) in this order:
(a) mixing a lithium compound, a nickel compound and a compound of an element M (wherein M is at least one element selected from the group consisting of B, Al, Ga, In, Si, Ge, Sn, Mg, Sc, Y, Ti, Zr, Hf, V, Nb, Ta, Cr, Mo, W, Mn, Tc, Fe, Ru, Co, Rh, Ir, Ni, Pd, Cu, Ag, Zn and Cd) to obtain a mixture,
grinding the mixture and then
calcining the ground mixture at 700° C. or higher and 1,200° C. or lower to obtain a compound (A);
(b) grinding the compound (A) to obtain the granular material (A);
(c) placing the deposit (B) on the particle surface of the granular material (A) in a granular or layered form to obtain a granular positive electrode active material; and
(d) removing 5 to 40% by weight of particles out of the granular positive electrode active material, accumulated from the finer particle side.

* * * * *